Sept. 28, 1926.

A. O. ABBOTT, JR 1,601,550

CONTINUOUS BIAS CUTTING MACHINE

Filed August 7, 1923  5 Sheets-Sheet 1

Fig.1.

INVENTOR.
ADRIAN O. ABBOTT, JR.
BY
HIS ATTORNEY.

Sept. 28, 1926.  
A. O. ABBOTT, JR  
1,601,550  
CONTINUOUS BIAS CUTTING MACHINE  
Filed August 7, 1923 5 Sheets-Sheet 2

INVENTOR.
ADRIAN O. ABBOTT, JR.

BY
HIS ATTORNEY.

Patented Sept. 28, 1926.

1,601,550

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

CONTINUOUS BIAS-CUTTING MACHINE.

Application filed August 7, 1923. Serial No. 656,150.

This invention relates to cutting machines in general, and in particular, to a machine for continuously preparing plies of stock for tires or other articles of rubber composition.

While it has been variously proposed to cut rubberized fabric for plies of pneumatic tire casings, the most largely used machine comprises an intermittently operated knife and an intermittent feed for the fabric, which latter is moved step by step an amount equal to the width of ply desired. Ordinarily, the plies or cut strips are lifted up or conveyed away for booking or rolling up and splicing. This commonly used machine is necessarily limited in speed of operation, requires considerable attendance upon, and many operators to finally prepare the cut strips in a condition manipulated with facility at the tire building machines.

The present invention aims to provide a machine that may be used for cutting any kind of rubberized fabric, square woven or weftless being most largely used today in manufacturing tires. It aims to provide a machine in which the fabric is fed continuously, rather than step by step or intermittently; in which the cutting is a continuous, rather than an intermittent, operation; in which the cut strips, if desired, may be wound up, preferably but not necessarily, without tension lengthwise of the strip, tension being objectionable for tire building purposes; in which the cut strips may be wound up with a liner interposed between their convolutions and at a rate of speed approximating the rate the strips are cut; and in which the cut strips may be, and preferably are, spliced together; all these mechanically without supplemental manual operations. A plurality of plies of the same width or of different widths may be simultaneously cut. The correct number and the proper widths of plies for one size of tire may be simultaneously prepared on one machine. And the angle of the cut may be varied within the requirements in factory practice, i. e., the cords of the weftless fabric, or the warp threads of square woven fabric, may be disposed at a desired angle to the cut edges of the strip. With the machine of the present invention, the stock rolls may be completely prepared ready for delivery to the tire builders at various stations in the factory. These are some of the objects and advantages of the invention, others will appear later in the detailed description of the apparatus.

With the preferred embodiment of the invention in mind but without intention to limit its scope more than is required by the prior art, the invention consists in a rotatable mandrel whose fabric-supporting surface is formed by a series of endless belts or cables that are continuously moved lengthwise of the mandrel so as to carry to a plurality of cutters a sleeve or tube of fabric that is continuously wrapped about the mandrel. The several strips thereby formed are preferably wound up, with a liner, if desired, between their convolutions, and in the preferred embodiment, the liner is arranged to take the strain from the cut fabric which, for tire building purposes, is desirably left in its normal or free condition without any lengthwise strain.

A preferred embodiment of the machine of the present invention is illustrated in the accompanying drawings in which:—

In the illustrated embodiment, the machine is shown comprising a mandrel indicated generally by the numeral 1, about which a sheet of fabric is wrapped in tubular polygonal form and fed axially to cutters 2, which are rotatable with the mandrel but fixed against movement axially thereof, a device indicated generally at 3 for leading in or directing a sheet of fabric 4 to the mandrel at an angle insuring the formation of a tube of fabric—the convolutions of the strip abutting or over-lapping a little, the latter preferably—and a wind-up mechanism, indicated generally by the numeral 5, for coiling up the cut strips at the rate that the continuously formed fabric is severed. If the spiral wraps of the fabric 4 about the mandrel 1 are over-lapped, as indicated at 6, a presser roll 7 is preferably employed to splice the lap joint.

The various mechanisms are preferably carried on a stationary base plate 10 revolvably supporting a turntable 11, which carries the mandrel 1 and wind-up mechanism 5, anti-friction bearings 12 being preferably provided as indicated. At one side, the base 10 has fixed to it a post 13 provided with an arcuate guide-way 14, whose center of curvature preferably coincides with the center of the presser roll 7. Within the guide-way 14 is adjustably supported the curved end 15 of a bifurcated frame 16, one arm 17 of which supports the presser roll 7, this latter being rotatably supported on a rod 18, see Figure 11, which is hinged at 19 to the arm 17, between a limiting stop 20 and a spring 21. The frame 16 has a second arm 22, revert to Figure 1, which carries a roll 23 that may be of any suitable construction but is preferably of the well-known "spreader" type, capable of adjustment by means of the hand-wheel 24 and suitable connections 25 between the same and the central shaft 26 of the roll for varying the width of the fabric 4 so as to keep the same substantially uniform. The details of the spreader roll 23 are not illustrated, being well-known at least in the rubber industry, one such known as the Curtis & Marble type being available on the market at the present time. At the curved end 15 of the frame 16 may be provided any suitable means for effecting adjustment of the frame, such as the rack 27 and worm 28 operable by the hand-wheel 29. By adjustment of the frame 16, the angular relation of the directing roll 23 to the mandrel 1 may be varied and thus the machine used for cutting through the cords or warp yarns at different angles.

Figure 1:
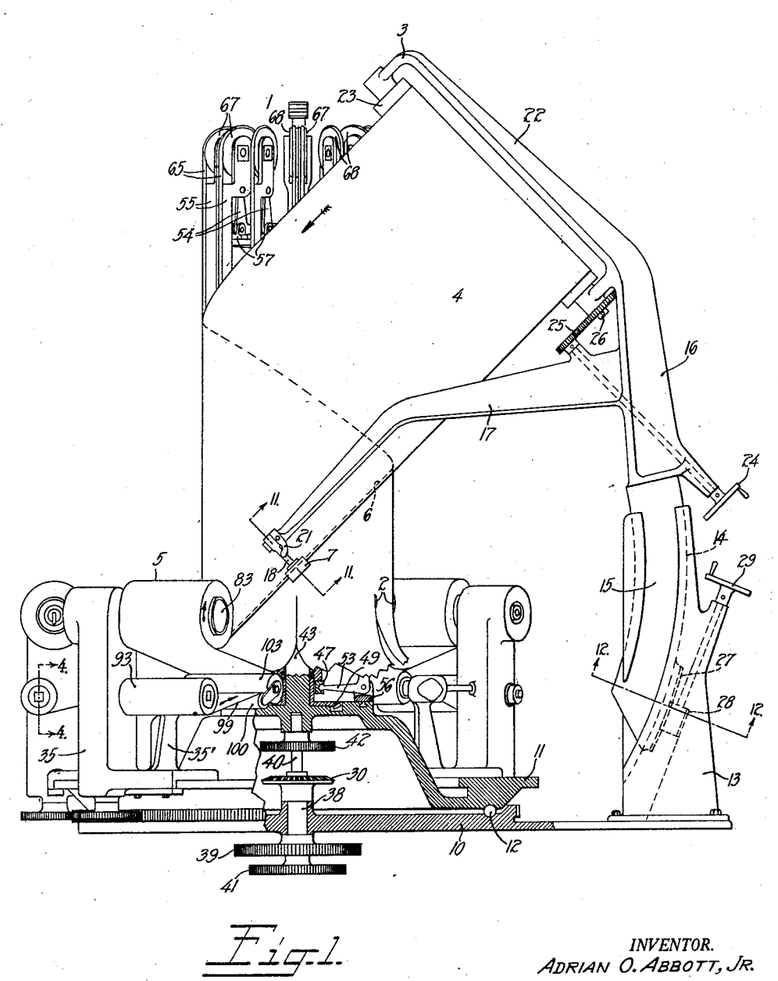
Figure 1 is an elevation, partly in section, of one form of the apparatus.
Figures 3, 4, 5:
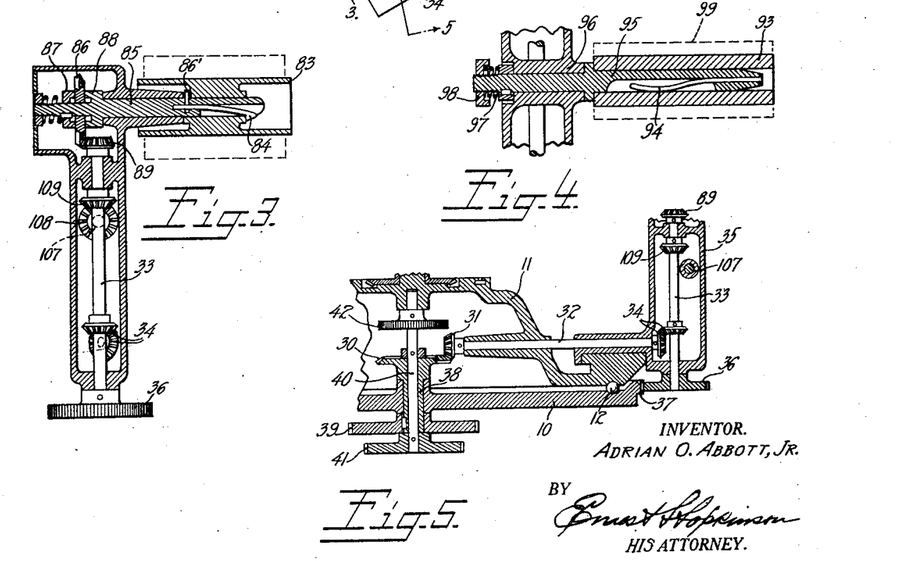
Figure 3 is a vertical section on the line 3—3 of Figure 2.
Figure 4 is another vertical section on the line 4—4 of Figure 1.
Figure 5 is a partial vertical section on the line 5—5 Figure 2.

The turntable 11 is adapted to be rotated as shown in Figures 1 and 5 of the drawings, particularly the latter, from a gear 30 which meshes with another gear 31, on a horizontal shaft 32, which is journalled in the turntable 11, the shaft 32 at its opposite end being connected to a vertical shaft 33 by means of intermeshing bevel gears 34. The shaft 33 is journalled in a hollow column 35 fixed to the turntable 11, and at its lower end carries a pinion 36, which cooperates with a stationary rack 37 fashioned on the base 10. The gear 30 has a sleeve 38, which is journalled in the base plate 10 and projects below the same sufficiently to permit keying thereto a main driving-gear 39. Within the sleeve 38 rotates independently a shaft 40 which has pinned to its opposite ends another main driving-gear 41 and pinion-gear 42. From the gear 42, the endless supporting elements (cables or belts) for the tubular fabric are operated as will later appear.

Figures 6, 7, 8:
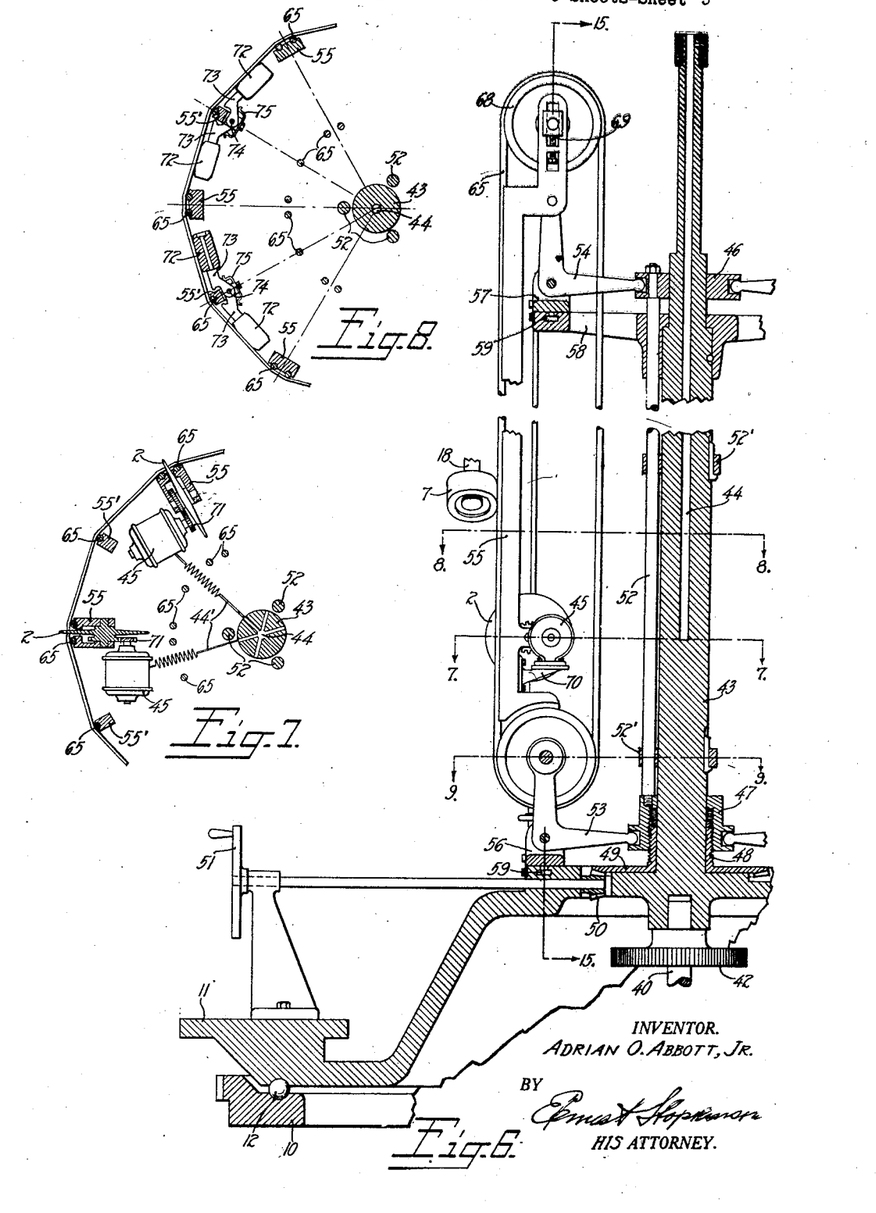
Figure 6 is a vertical section on the line 6—6 Figure 2.
Figure 7 is a horizontal fragmentary section on the line 7—7 Figure 6.
Figure 8 is a horizontal fragmentary section on the line 8—8 Figure 6.
Figures 15, 16:
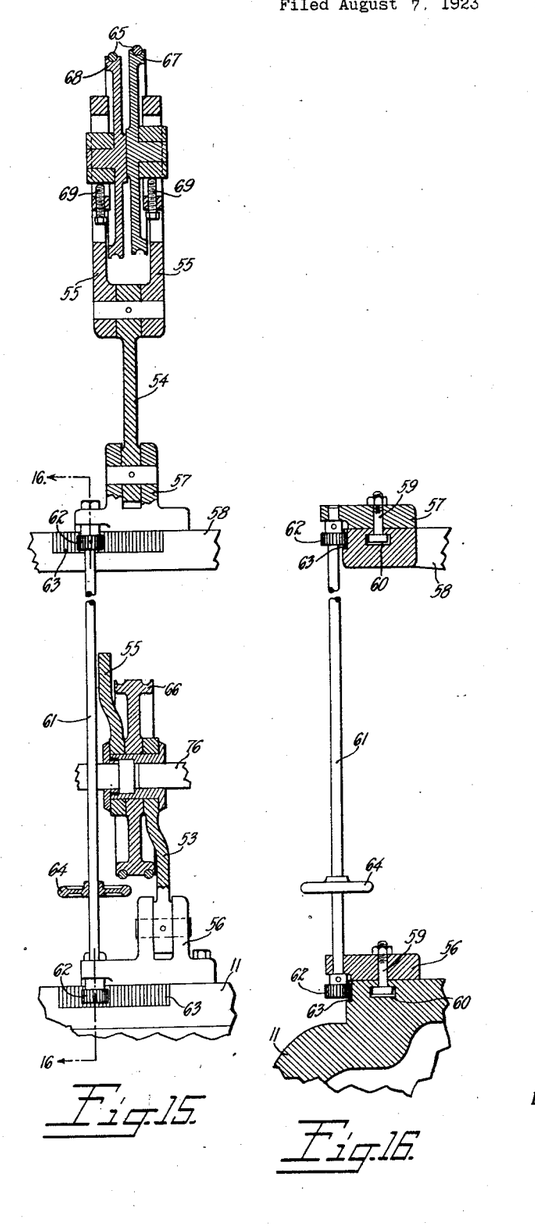
Figure 15 is a section on the line 15—15 Figure 6.
Figure 16 is a section on the line 16—16 Figure 15.

At the center of the turntable 11 rises a post 43, see Figures 6 and 7, which is centrally apertured, as at 44, to receive wiring 44' for conducting electric current to motors 45 that drive the cutting discs 2. On the opposite ends of the post 43, are collars 46 and 47, the former being slidable and the latter threaded internally for cooperation with the threaded boss 48 of a bevel gear 49, which is adapted to be turned by a bevel pinion 50 manually operable by the hand-wheel 51. The collars 46 and 47 being fixedly connected by rods 52, operation of the hand-wheel 51 will simultaneously shift the two collars in the same direction and in an equal amount. At 52' are shown fixed guiding collars through which the rods 52 slide. Each of the collars 46 and 47 is cut away to receive the rounded ends of bell-cranks 53 and 54, whose upper ends pivotally support a frame 55. Each of the bell-cranks 53 and 54 is fulcrumed between ears rising from blocks 56 and 57, which are adjustably supported on arms 58 and portions of the turntable 11, respectively. The adjustable supporting construction of the blocks 56 and 57 may be anything convenient but preferably comprises a depending bolt 59, Figures 15 and 16, whose head is movable in an arcuate slot 60 fashioned in the relatively stationary arm 58 and turntable 11, respectively. Rods 61, anchored in the blocks 56 and 57 carry pinions 62 at their opposite ends, which pinions are adapted to engage with racks 63. By turning the hand-wheel 64, a pair of the blocks 56 and 57 may be shifted arcuately and thereby their bell-cranks 53 and 54 may be adjusted laterally.

The frames 55, of which there may be any suitable number (six being employed in the illustrated embodiment), carry the endless fabric-supports, which are preferably in the form of cables 65. Frames 55 each preferably carry two of these endless cables which pass over sheaves 66—67 and 68, rotatably supported at the upper and lower extremities of the frames.

A second set of frames 55′ is preferably provided for single cables 65, these frames 55′ being substantially identical with the frames 55 already described. The supports for the frames 55′ are similar to those for the frames 55 and may be made laterally adjustable but preferably are not. Both sets of frames 55 and 55′ however, being supported by upper and lower bell-crank levers 53 and 54, may be shifted radially relative to the post 43, by turning the hand-wheel 51. And thus, of course, the fabric-supports (cables 65) are always maintained in parallelism with the axis of the post 43. Desirably, the upper sheaves on the frames 55 and 55′ are adjustably supported as at 69 in Figure 6 in a well-known manner.

The cutting discs 2, see Figure 7, are preferably journalled in projections of the frames 55 so as to extend between and beyond a pair of the cables 65 carried by each of the frames 55. Each of the cutting discs 2 may be driven by a motor 45, which latter rests on a bracket 70 fastened to the frame 55, a suitable gear-drive 71 (or direct connection) being provided between the motor 45 and the cutting discs 2. At the same elevation as the presser roll 7, the frames 55′ are preferably provided with rolls 72, which are supported by arms 73 hinged, as at 74, to the frames 55′ and yieldingly pressed outwardly by springs 75. These rolls support the fabric on the side opposite the presser roll 7 and cooperate therewith in effecting the splice, if made, between overlapping convolutions of the sheet of supplied fabric.

Figures 9, 10, 11, 12, 13:
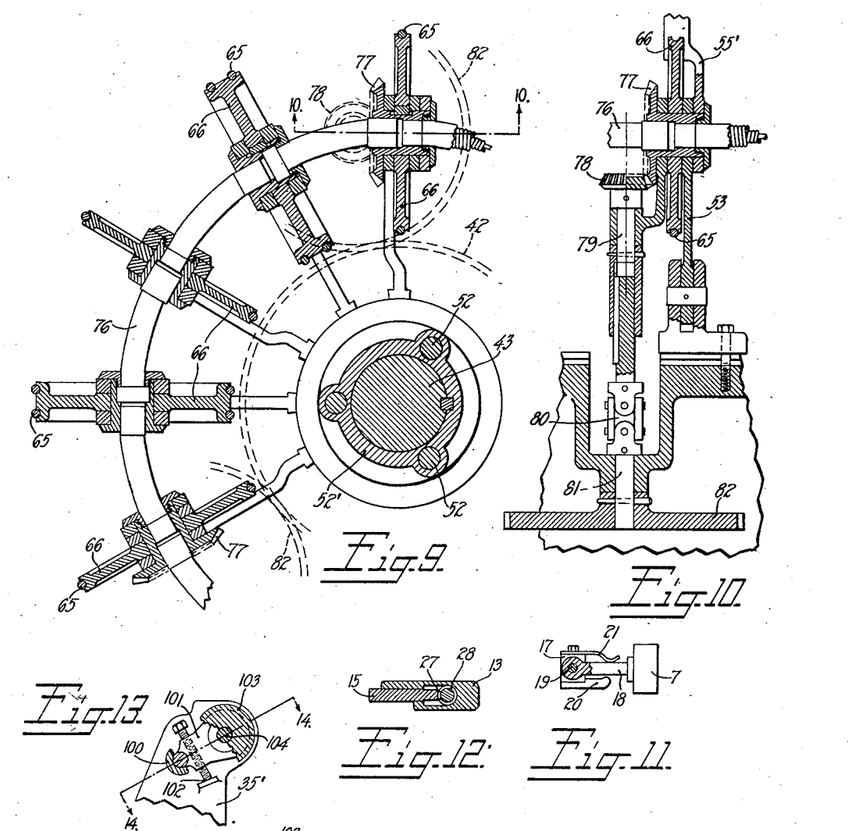
Figure 9 is a partial section on the line 9—9 Figure 6.
Figure 10 is a fragmentary section on the line 10—10 Figure 9.
Figure 11 is a detailed section on the line 11—11 Figure 1.
Figure 12 is a sectional detail on the line 12—12 Figure 1.
Figure 13 is a detailed section through a liner feed roll about on the plane indicated by the line 13—13 Figure 2.

The cables 65 are actuated from the lower sheaves 66, see Figures 9 and 10, which are connected to a flexible shaft 76, that allows for the slight amount of lateral adjustment found necessary. The flexible shaft 76 has fixed to it a bevel gear 77 which co-operates with a complementary bevel gear 78 on a vertical shaft 79 that is made in feathered-together sections capable of limited vertical movement, the lower section of the vertical shaft 79 being articulated, as at 80, to a stud shaft 81, on which is fastened a gear 82, meshing with the before-mentioned gear 42, which is journalled immediately below the top of the turntable 11.

From the above it will, therefore, be seen that the mandrel 1 consists essentially of endless fabric-supporting members 65, which are adapted to be continuously moved in a downward or axial direction so as to feed a tube of fabric that is continuously formed about the members 65 against a plurality of cutters 2 that divide the tube of fabric into widths or strips. The tube into which the fabric 4 is continuously formed by reason of the bodily rotation of the cables 65 about the axis of the post 43 is not truly cylindrical rather it is polygonal.

The cut widths are preferably rolled up as fast as they are severed and the wind-up mechanisms 5, now to be described, are therefore preferably supported on the turntable 11, so as to move around with the mandrel 1. Referring to Figure 1, the wind-up roll is indicated at 83, the liner supply-roll at 93 and the liner feed regulating roll at 103, these several parts being supported by the hollow column 35 and upright bracket 35′, respectively, which are attached to the turntable 11.

The wind-up roll 83, see Figure 3, is demountably secured by the spring 84 on a shaft 85 carrying a pin 86, which enters a U-shaped slot in the hub of the shell-like roll 83, and thereby compels the latter to rotate with the shaft 85. The shaft 85 is driven through a pinion 86 loose thereon but frictionally confined between the spring-pressed collar 87 and a collar 88 fixed to the shaft 85. Thus is constituted a slip clutch drive for the wind-up roll 83. The bevel gear 86 meshes with another, 89, on the before-mentioned shaft 33, which is driven from the gear 39, Figure 5, as previously described—the train of connections being indicated at 39, 30, 31, 32 and 34. The slip clutch constituted by the parts 86, 87 and 88, permits the wind-up roll to always be driven, or tend to be driven, a little faster than the strips of stock are cut, but the liner feed-roll 103, which is positively driven at the same peripheral speed as the cables 65, governs the wind-up on the roll 83, as will now be made apparent.

Figure 2:
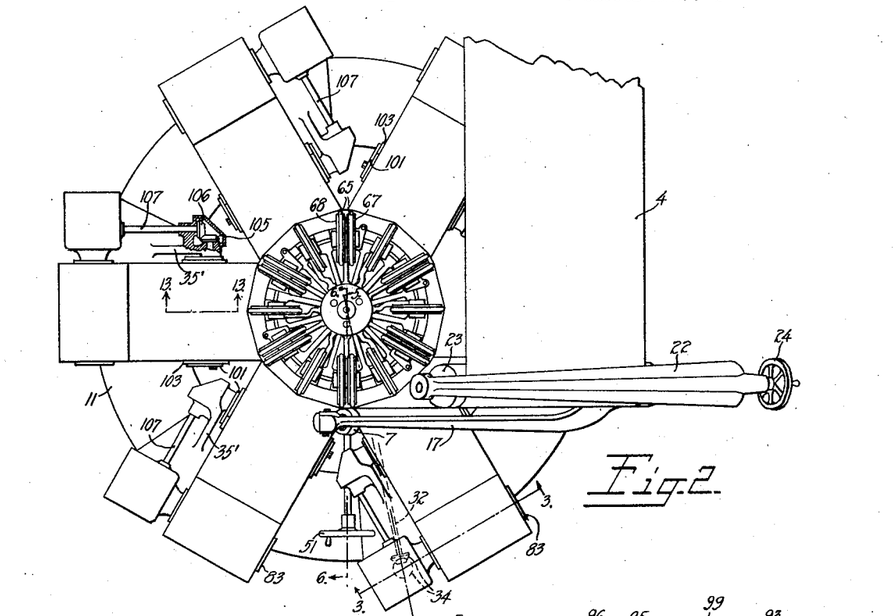
Figure 2 is a plan view looking down on the top of Figure 1.
Figure 14:
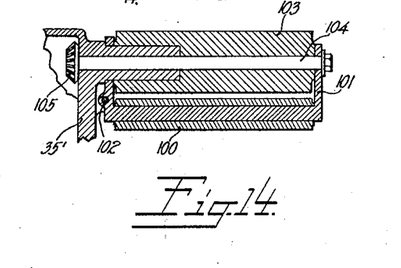
Figure 14 is a sectional view on the line 14—14 of Figure 13.

The liner supply-roll 93, Figure 4, is frictionally held by a spring 94 on the end of a square shaft 95, which is rotatably supported in bearings 96, but prevented from too free rotation or coasting by a spring 97 thrusting outwardly on a collar 98 and thereby braking rotation of the roll 93 when the liner 99 coiled thereabout is pulled upon in the direction of the arrow, Figure 1. The liner 99 passes over an idle-roll 100, Figures 13 and 14, which is carried by arms 101 hinged upon the axis of the liner feed-roll 103, the arms 101 being adjustable by means of the screw and lug device 102, so as to permit the liner to be encircled more or less about the liner feed-roll 103, as required to effectively control the feed of the liner 99. The liner feed-roll 103 is fixedly secured to a shaft 104 having at one end within the housing 35', a beveled pinion 105, which is driven by another pinion 106, see Figure 2, on one of a horizontal shaft 107, whose opposite end is connected by bevel gears 108 and 109, Figure 3, to the before-mentioned shaft 33, to which latter the pinion 109 is fast.

The fabric 4, which is to be continuously cut, may be supplied to the guide-roll 23 in any suitable manner and from above the machine or from a large supply-roll supported at the same floor level, in which latter case, it may be passed around angular guides or rolls (not shown). Preferably, tension will be maintained upon the stock roll from which the supply of fabric 4 is drawn. Its liner may be drawn off and wound up in any convenient manner. The fabric 4 is drawn over the roll 23 by rotation of the mandrel 1. Tension devices may be utilized on the stock roll to maintain the fabric 4 taut and smooth. The fabric 4 usually varies a few inches in its approximate sixty inches in width but by maintaining it under tension, this variation is reduced. The operator determines the width at which the fabric 4 is to be maintained while being wrapped around the mandrel 1, and keeps the width approximately constant by operation of the hand-wheel 24, governing the spreader roll 23.

The fabric 4 is usually elastic enough to permit slight variation in the width of plies being cut, but if the variation in width is considerable, the girth of the polygonal mandrel 1, which is constituted by the feeding cables 65, may be varied. This may be effected by radial adjustment of the frames 55 and 55' from the hand-wheel 51 and train of connections between the same and the supporting pairs of bell-cranks 53—54, which sustain the frames 55—55' in parallelism with the axis of the mandrel. If it is desired to simultaneously cut strips of different width, the frames 55 may be individually adjusted relative to frames 55' by the hand-wheels 64 and several connecting trains of mechanism to the pairs of blocks 56—57, which support the fulcrums of alternate (in the illustrated embodiment of the invention at least) pairs of bell-crank levers 53—54.

Variation of the cutting angle may be effected by adjustment of the leading in or directing roll 23, at least when it is desired to effect moderate angular change in the disposition of the warp yarns (of woven fabric) or cords (of weftless fabric) relative to the lengths of the cut strips or plies of stock.

*Operation.*—As the mandrel 1 rotates and the stock 4 is drawn and wrapped about the same, the endless cables 65, which constitute the external supporting surface of the mandrel, will also convey the fabric in the form of a tube downwardly at a rate of speed approximately equal to the component of motion of the fabric resolved in a direction parallel to the axis of the mandrel 1. The windings of the fabric 4 about the mandrel 1 may lap as indicated at 6, or not, but preferably they are lapped and spliced by the co-operating action of the presser roll 7 and the rolls 72 on the inside of the tube of fabric. The amount of lap 6, of course, may be varied. The tube into which the sheet of fabric 4 is formed is continuously fed or conveyed by the cables 65 to the cutting knives 2 (of which there may be any suitable number) and thereby slit or divided into one or more strips. The several strips are led, as shown, to the wind-up reels 83, being supported at a point in proximity to the cables by the liners 99, each of which is drawn from a liner supply-roll 93 over an idler 100 and around a liner feed-roll 103, thence to the wind-up reel. The liners 99 are substantially inextensible. Each liner 99 is pulled upon by the wind-up reel 83 faster than the strips are cut, but the liner feed-roll 103 being positively driven at the same peripheral speed as the cables 65 and being substantially encircled by the liner, the cut strips are coiled up substantially without tension. This is a desirable, but not essential, feature of the present invention as other expedients may, of course, be utilized, it being only necessary to remove the strips as they are cut so as not to foul and stop the apparatus.

The feed of the endless fabric-supporting members or cables 65 in any given construction must bear a certain definite relation to their bodily lateral and circular movements relative to the axis of the mandrel 1. In other words, the traveling movement of the endless cables 65 must bear a certain definite relation to their rotation. Hence it is desirable that the main driving gear 39, which governs the speed of rotation of the mandrel, have a definite angular velocity relative to the second main gear 41, which governs the travel of the endless cables 65. In the drawings, Figures 1 and 5, these two gears are not shown coupled up with a source of power, as any suitable means may be used to drive them at relative pre-determined angular velocities, such for instance as the well-known "Reeves" variable power transmitter.

The machine is almost entirely automatic and very little attendant labor is required. When the supply of fabric 4 is exhausted, the end of another stock roll is spliced on to the end of the exhausted roll. The apparatus is capable of much greater speed than any other cutter heretofore marketed, cuts accurately and uniformly, and the cut strips may be removed from the machine in a condition ready for tire builders, for instance, whereas, heretofore in that particular branch of the rubber industry many other manual operations have been necessary.

It will be obvious that many changes may be made in the apparatus—such as the number of cutters and endless cables—without departing from the underlying principles of the invention, which it is intended to comprehend broadly as well as specifically in the accompanying claims, and reference should be made thereto for an understanding of the scope of the invention.

Having thus described my invention, what I claim as new and desire to protect by Letters Patent is:—

1. A fabric cutting apparatus including in combination, a rotatable mandrel having an endless supporting means part of which is always presented externally of the mandrel, means for moving the mandrel and supporting means and fabric cutting means.

2. A fabric cutting apparatus including in combination, a rotatable mandrel having endless fabric supporting members, means for moving the mandrel, means for moving said members, and means for continuously cutting fabric in tubular form parallel to its axis while supported and advanced by said members.

3. A fabric cutting apparatus including in combination, a rotatable mandrel having endless fabric supporting members, means for moving the mandrel, means for moving said members, means for continuously cutting fabric in tubular form parallel to its axis while supported and advanced by said members so as to form a plurality of strips, and means for continuously winding up the strips.

4. A fabric forming apparatus including in combination, a mandrel having a plurality of endless members for supporting and feeding fabric in tubular formation, means for moving the mandrel, and means for moving said endless members.

5. A fabric cutting apparatus including in combination, a mandrel having a plurality of endless members for supporting and feeding fabric in tubular formation, means for moving the mandrel and endless members, and means for cutting the tube of fabric, said last-named means being operatively anchored to and rotatable with the mandrel.

6. A fabric cutting apparatus including in combination, a rotatable mandrel having a plurality of endless members for supporting and feeding fabric in tubular formation, means for continuously cutting the tube of fabric fed by said mandrel into a plurality of strips, and means for winding up the strips as they are cut.

7. A fabric cutting apparatus including in combination, a rotatable mandrel with a continuously moving fabric-supporting surface, a roll for directing a sheet of fabric to said mandrel at an angle so as to continuously form a tube of fabric about the mandrel, means bodily movable with the mandrel about its axis for cutting a tube of fabric into strips, and means for winding up the strips as they are cut substantially free of tension.

8. A fabric cutting apparatus including in combination, a rotatable mandrel with a continuously moving fabric-supporting surface, a spreader roll for directing a sheet of fabric to said mandrel at an angle so as to continuously form a tube of fabric about the mandrel, means bodily movable with the mandrel and about its axis for cutting a tube of fabric parallel into strips, means for winding up the cut strips, and means for interposing a liner between convolutions of the cut strips.

9. A fabric cutting apparatus including in combination, a rotatable mandrel with a continuously moving fabric-supporting surface, a roll for directing a sheet of fabric to said mandrel at an angle so as to continuously form a tube of fabric about the mandrel, means bodily movable with the mandrel and about its axis for cutting a tube of fabric parallel to its axis, means for winding up the cut strips including a source of liner supply, and means for regulating the feed of the liner to the wind-up reel at a rate of speed substantially equal to the rate the strips are cut.

10. A fabric cutting apparatus including in combination, a rotatable mandrel having a plurality of endless members defining a tubular supporting surface, means for continuously moving said endless members, a spreader roll for conducting a sheet of fabric to said mandrel at an angle insuring the formation of the sheet into a tube about the mandrel, and fabric cutting means.

11. A fabric cutting apparatus including in combination, a rotatable mandrel having a plurality of endless members defining a tubular supporting surface, means for continuously moving said endless members, a spreader roll for conducting a sheet of fabric to said mandrel at an angle insuring the formation of the sheet into a tube about the mandrel, an adjustable support for said spreader roll permitting variation of its angular relation to the axis of the mandrel, and fabric cutting means.

12. A fabric cutting apparatus including in combination, a rotatable mandrel having a plurality of endless members defining a tubular supporting surface, means for continuously moving said endless members, a spreader roll for conducting a sheet of fabric to said mandrel at an angle insuring the formation of the sheet into a tube about the mandrel, an adjustable support for said spreader roll permitting variation of its angular relation to the axis of the mandrel, and means carried by the mandrel for cutting the tube of fabric into a plurality of strips.

13. A fabric cutting apparatus including in combination, a rotatable mandrel having a plurality of endless members defining a tubular supporting surface, means for continuously moving said endless members, a spreader roll for conducting a sheet of fabric to said mandrel at an angle insuring the formation of the sheet into a tube about the mandrel, an adjustable support for said spreader roll permitting variation of its angular relation to the axis of the mandrel, means carried by the mandrel for cutting the tube of fabric into a plurality of strips, and means for winding up the strips as they are cut.

14. A fabric cutting apparatus including in combination a rotatable mandrel having a plurality of endless members defining a tubular supporting surface, means for continuously moving said endless members, a spreader roll for conducting a sheet of fabric to said mandrel at an angle insuring the formation of the sheet into a tube about the mandrel, an adjustable support for said spreader roll permitting variation of its angular relation to the axis of the mandrel, means carried by the mandrel for cutting the tube of fabric into a plurality of strips, means for winding up the strips as they are cut, and means for manually adjusting the spreader roll to maintain substantially uniform in width the fabric being conducted to the mandrel.

15. A fabric cutting apparatus comprising in combination, rotatable means for continuously forming a tube of fabric from a sheet thereof, means for simultaneously cutting the tube of fabric into a plurality of strips, and means for continuously winding up each of a plurality of strips independently of each of the others.

Signed at Detroit, county of Wayne, State of Michigan, this 2nd day of August, 1923.

ADRIAN O. ABBOTT, Jr.